United States Patent
Cheng et al.

(10) Patent No.: US 9,302,919 B2
(45) Date of Patent: Apr. 5, 2016

(54) SEAWATER DESALINATION UNIT

(71) Applicant: Industrial Technology Research Institute, Hsin-Chu (TW)

(72) Inventors: Yung-Jen Cheng, Hsinchu (TW); Hung-Cheng Yen, Kaohsiung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 314 days.

(21) Appl. No.: 13/860,637

(22) Filed: Apr. 11, 2013

(65) Prior Publication Data

US 2014/0197084 A1     Jul. 17, 2014

(30) Foreign Application Priority Data

Jan. 11, 2013 (TW) .............................. 102200679 U (51) Int. Cl.
*C02F 1/44*     (2006.01)
*C02F 1/00*     (2006.01)
(Continued)

(52) U.S. Cl.
CPC .................. *C02F 1/002* (2013.01); *B01D 35/26* (2013.01); *B01D 35/30* (2013.01); *B01D 61/08* (2013.01);
(Continued)

(58) Field of Classification Search
CPC ......... C02F 1/002; C02F 1/003; B01D 35/26; B01D 35/30; B01D 61/08; B01D 61/10; B01D 61/18; B01D 61/20; B01D 2313/10; B01D 2313/18; B01D 2313/20; B01D 2313/24; B01D 2313/243; B01D 2313/40; B01D 2313/44; B01D 2313/90
See application file for complete search history.

(56) References Cited

U.S. PATENT DOCUMENTS 3,162,333 A * 12/1964 Davidson ............ B05B 11/3032
                                                                      222/207
5,019,252 A * 5/1991 Kamei .................... B01D 61/18
                                                                      210/136

(Continued)

FOREIGN PATENT DOCUMENTS

TW           354777           3/1999
TW           531430           5/2003
(Continued)

OTHER PUBLICATIONS

A tool for the design of desalination plants powered by renewable energies D. Voivontas, K., et al., Desalination, 2001, vol. 133, Issue 2 p. 175-198.

(Continued)

*Primary Examiner* — David C Mellon
*Assistant Examiner* — Pranav Patel
(74) *Attorney, Agent, or Firm* — WPAT, PC; Justin King; Douglas A. Hosack (57) ABSTRACT

A seawater desalination unit is disclosed, which comprises: a frame, an exit filtration part, and a water drawing part. The frame is configured with a reservoir, a water intake pipe and a water discharge pipe in a manner that the water intake pipe is connected to the reservoir respectively via one end thereof, while allowing a first check valve to be disposed at a position between the reservoir and the water intake pipe, and the water discharge pipe is connected to the second filtration part and the reservoir respectively via two opposite ends thereof, while allowing a second check valve to be disposed at a position between the high-pressure reservoir and the water discharge pipe. Moreover, the water drawing part is arranged in fluid communication with the water intake pipe.

26 Claims, 7 Drawing Sheets

(51) Int. Cl.
*B01D 61/14* (2006.01)
*C02F 1/28* (2006.01)
*C02F 1/42* (2006.01)
*B01D 35/26* (2006.01)
*B01D 35/30* (2006.01)
*B01D 61/08* (2006.01)
*B01D 61/10* (2006.01)
*C02F 103/08* (2006.01)

(52) U.S. Cl.
CPC .............. *B01D 61/10* (2013.01); *B01D 2313/20* (2013.01); *B01D 2313/243* (2013.01); *C02F 1/283* (2013.01); *C02F 1/42* (2013.01); *C02F 1/441* (2013.01); *C02F 2001/427* (2013.01); *C02F 2103/08* (2013.01)

(56) References Cited

U.S. PATENT DOCUMENTS

| | | | | |
|---|---|---|---|---|
| 5,358,635 | A | * | 10/1994 | Frank ..................... B01D 61/08 210/257.2 |
| 5,680,966 | A | * | 10/1997 | Johnson ................. G01F 11/084 222/209 |
| 2003/0164333 | A1 | * | 9/2003 | Nohren, Jr. .......... A45D 33/008 210/650 |
| 2008/0087597 | A1 | * | 4/2008 | Johann .................. B01D 35/30 210/232 |

FOREIGN PATENT DOCUMENTS

| | | |
|---|---|---|
| TW | 569808 | 1/2004 |
| TW | I263530 | 10/2006 |
| TW | M384830 | 7/2010 |

OTHER PUBLICATIONS

Solar Water Desalination in the Aral Sea Region Rashid A.Khaydarov, et al., Solar Desalination for the 21st Century 2007 p. 153-161.
Application of Ion-Exchange Techniques in Dilution of Seawater Chen,chih-yun, et al., 2006 4,47-49.
Application and Technology of Simple Sea Water Desalination for Non Potable Use Sun Bing-quan, et al, 2011 30(6), pp. 4-7.
Advances in seawater desalination technologies Akili D. Khawaji, et al., Desalination, vol. 221, Issues 1-3 Mar. 1, 2008 p. 47-69.
A review of membrane processes and renewable energies for desalination Catherine Charcosset Desalination, vol. 245, Issues 1-3 Sep. 15, 2009 p. 214-231.

* cited by examiner

SEAWATER DESALINATION UNIT

CROSS REFERENCE TO RELATED APPLICATION

This application also claims priority to Taiwan Patent Application No. 102200679 filed in the Taiwan Patent Office on Jan. 11, 2013, the entire content of which is incorporated herein by reference.

TECHNICAL FIELD

The present disclosure relates to a seawater desalination unit, and more particularly, to an effective, electricity-free, ease-to-operate and simple-in-structure portable filtration unit with seawater desalination ability which not only can be adapted for most sea activities and maritime salvage operations, but also can be adapted for purifying water in mountain-climbing activities or in service/rescue missions for remote areas.

BACKGROUND

In addition to the air, water is another important vital factor for sustaining life. However, water purificatrion can be a difficult task to be solved, especially for mount-climbing activities or for surival in remote underdeveloped areas, and reponsively there are already a variety of water purifiers to be developed accordingly that can be used for purifying rain water or/and polluted river water. Nevertheless, most of those water purifiers can be adapted for purifying and desalinating seawater. Thus, it is still problematic to obtain sufficient fresh water for personnel engaging in maritime activities, especially in time of disasters at sea. Consequently, it is important and vital for people drifting at sea waiting for rescue to have an effective, electricity-free, ease-to-operate and simple-in-structure portable filtration unit with seawater desalination ability which is able to desalinating and purifying seawater into drinkable fresh water.

SUMMARY

In an exemplary embodiment, the present disclosure provides a seawater desalination unit, which comprises: an exit filtration part, having at least one exit filter disposed thereat; a frame, configured with a reservoir, a water intake pipe and a water discharge pipe in a manner that the reservoir is formed with a first water storage volume, the water intake pipe is connected to the reservoir respectively via one end thereof, while allowing a first check valve to be disposed at a position between the reservoir and the water intake pipe, and the water discharge pipe is connected to the exit filtration part and the reservoir respectively via two opposite ends thereof, while allowing a second check valve to be disposed at a position between the reservoir and the water discharge pip; and a water drawing part, arranged in fluid communication with the water intake pipe for generating a water-drawing pressure to force a fluid to flow from an end of the water intake pipe that is not connected to the reservoir into the reservoir of the frame.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
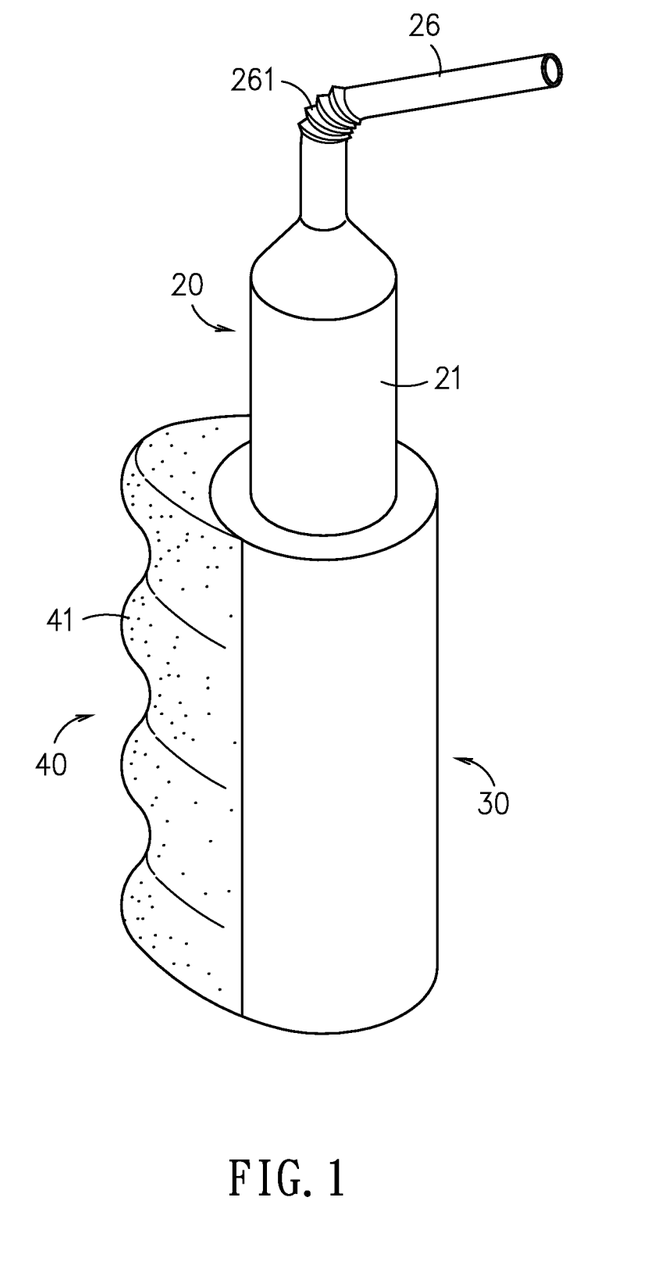
FIG. 1 is a three-dimensional view of a seawater desalination unit according to a first embodiment of the present disclosure.
Figure 2:
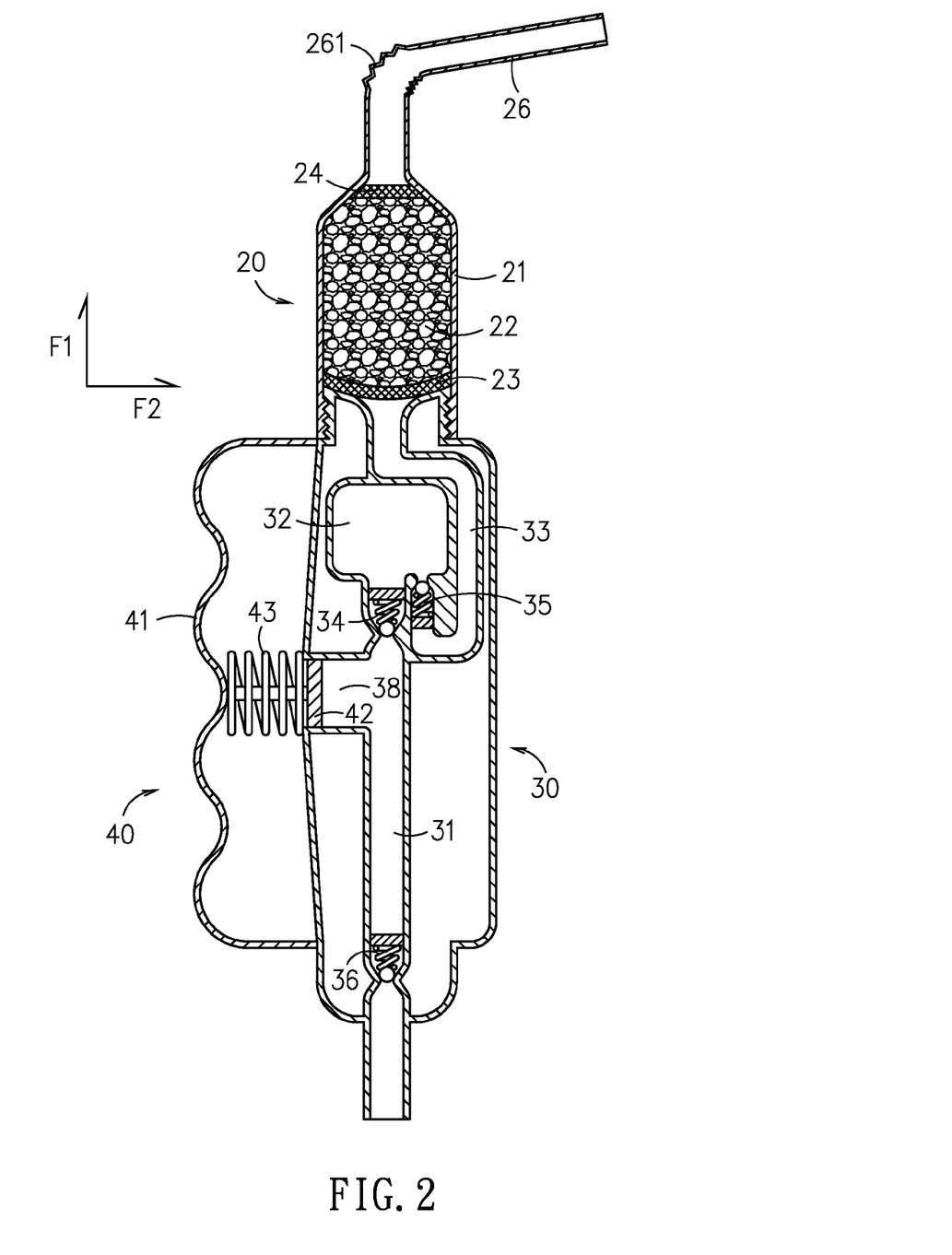
FIG. 2 is a cross-sectional view of the seawater desalination unit according to the first embodiment of FIG. 1.
Figure 3:
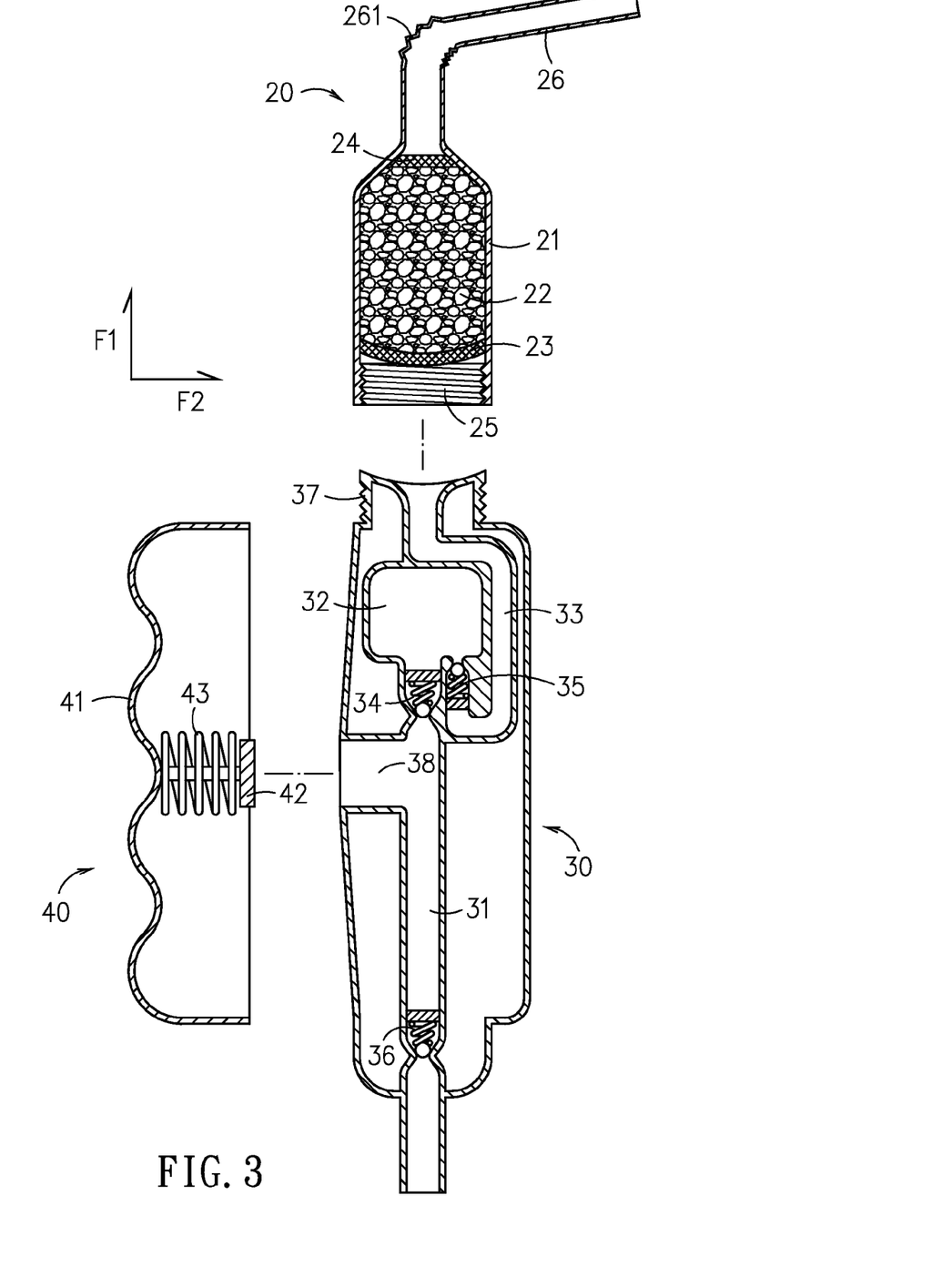
FIG. 3 is an exploded cross-sectional view of the seawater desalination unit according to the first embodiment of FIG. 1.

Please refer to FIG. 1 to FIG. 3, which shows a seawater desalination unit according to a first exemplary embodiment of the present disclosure. As shown in FIG. 1 to FIG. 3, the seawater desalination unit comprises: an exit filtration part 20, a frame 30 and a water drawing part 40.

The exit filtration part 20 is configured with a first shell 21 to be used for receiving a resin filter 22 therein, whereas the resin filter 22 is formed by the mixing of cation exchange resin particles and anion exchange resin particles, and is arranged sandwiching between two membrane filters 23, 24. It is noted that each of the two membrane filters 23, 24 can be made of a non-woven cloth. Moreover, the first shell 21 and the frame 30 are respectively configured with mating screw threads 25, 37 for allowing the exit filtration part 20 to mount detachably to the frame 30. In this embodiment, there is a tube-like structure 26 formed on an end of the exit filtration part 20 that is arranged opposite to another end of the exit filtration part 20 connecting to the frame 30, and the tube-like structure 26 is configured with a flexible structure 261 for allowing the tube-like structure to become bendable and retractable. In this embodiment, the flexible structure 261 is corrugated in a wave-like shape, but it is not limited thereby, and thus the tube-like structure 26 can be a bar-like, arc-like tube or an irregular tube. In addition, the tube-like structure 26 can be made of a flexible material or a rigid material, such as a plastic or rubber. It is noted that the resin filter 22 can be replaced by a reverse osmosis (RO) membrane, and therefore, the exit filter arranged inside the exit filtration part 20 can be a resin filter, a RO membrane, or a membrane filter, but is not limited thereby.

The frame 30 is made of a water-resistance material, such as a plastic. In addition, the frame 30 is configured with a water intake pipe 31, a reservoir 32 and a water discharge pipe 33. The water intake pipe 31 is extending in a direction parallel to a first direction F1 by a length, and is connected to the reservoir 32 via one end thereof, while allowing another end thereof to extrude out of the frame by a length. The reservoir 32 is formed with a first water storage volume and is charged with air to a predefined pressure that can be larger than 1 atm for instance. There is further a first check valve 34 being arranged at a position between the reservoir 32 and the water intake pipe 31. In addition, the water discharge pipe 33 is connected to the exit filtration part 20 and the reservoir 32 respectively via two opposite ends thereof, while allowing a second check valve 35 to be disposed at a position between the reservoir 32 and the water discharge pipe 33, whereas the second check valve 35 is designed to withstand a an accumulation pressure. In an embodiment, there is further a third check valve 31 arranged at the water intake pipe 31.

The water drawing part 40 is mainly composed of: a flexible housing 41, a piston 42 and an elastic element 43. The flexible housing 41 is disposed outside the frame 20 for allowing an accommodation space to be formed therebetween. In this embodiment, the flexible housing 41 is corrugated into a wave-like shape and can be made of a flexible water-resistance material, such as plastic or rubber. The piston 42 is disposed inside the flexible housing 41 while being arranging inside a water-drawing tank 38 that is arranged in fluid communication with the water intake pipe 31 as the water-drawing tank 38 is arranged extending in a second direction F2 by a length. In an embodiment, the first direction F1 and the second direction F2 are orientated perpendicular to each other. The elastic element 43 is arranged inside the flexible housing 41 at a position between the flexible housing 41 and the piston 42 to be used for providing a resilience force to work upon the flexible housing 41 and the piston 42.

Figure 4:
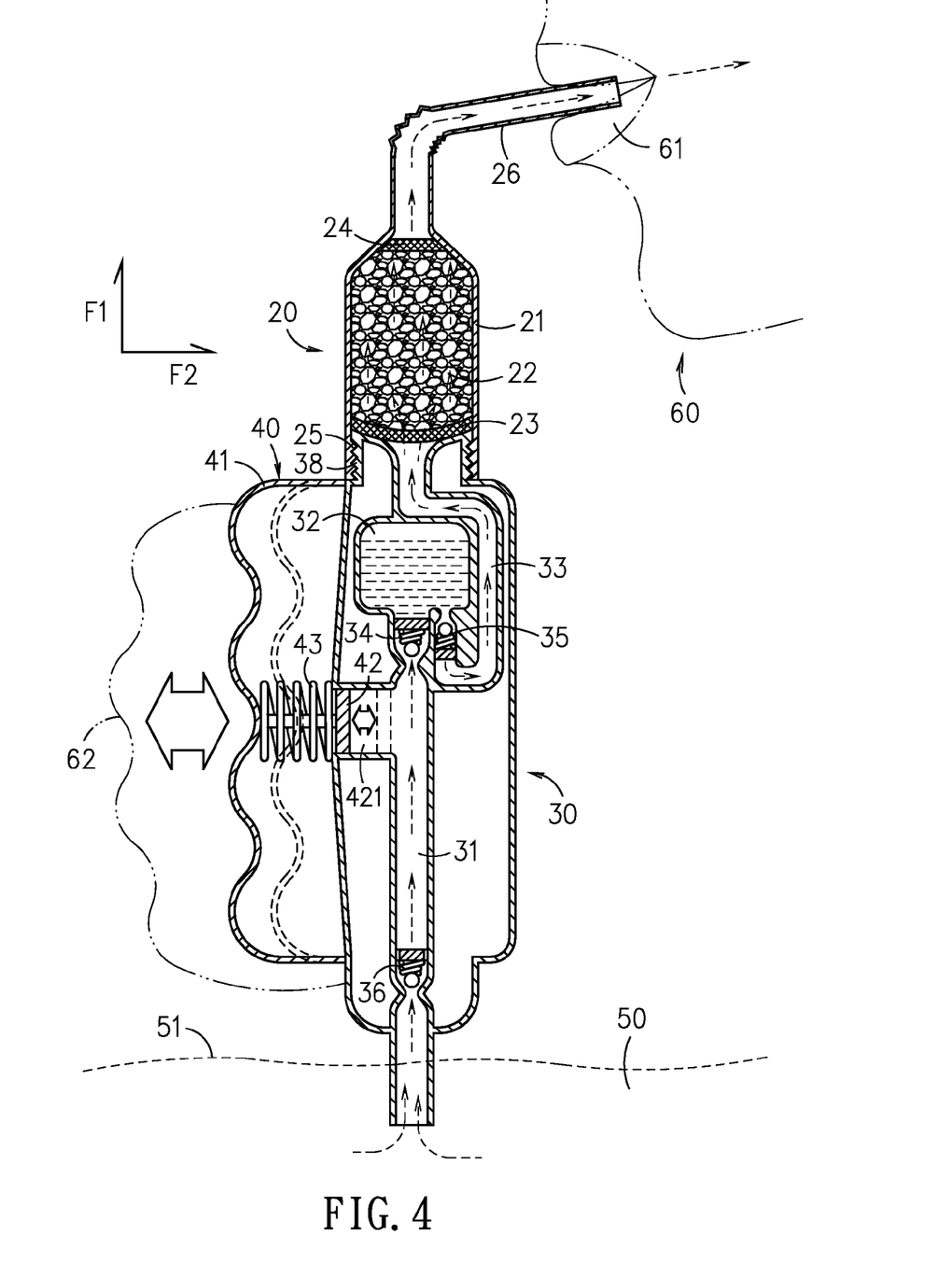
FIG. 4 is a schematic diagram showing an operating seawater desalination unit according to the first embodiment of FIG. 1.

Please refer to FIG. 4, which is a schematic diagram showing an operating seawater desalination unit according to the first embodiment of FIG. 1. The end of the water intake pipe 31 that is opposite to the one end thereof connecting to the reservoir 32 is submerged in a fluid 50, whereas the fluid 50 can be seawater, fresh water, sewage water or any fluid required to be filtered and purified. There is no restriction to the length of the water intake pipe 31 that is extending out of the frame 30, or to the orientation angle of the water intake pipe 31 relating to the frame 30. As shown in FIG. 4, the second shell 11 and the water intake pipe 31 are respectively extending in the first direction F1 that is about perpendicular to a level surface of the fluid 50. The tube-like structure 26 is formed in a shape adapted to the mouth 61 of a user 60, as the flexible housing 41 is hold by a hand 62 of the user 60. Thereby, between the pressing and the releasing of the flexible housing 41 from the exterior thereof, the elastic element 43 as well as the piston 42 are being pressed and released reciprocatively, and thus the piston 42 can be brought along to move reciprocatively inside the water-drawing tank 38 in a direction parallel to the second direction F2. Consequently, by the reciprocating movement of the piston 42, a water drawing pressure is generated to be used for forcing the fluid 50 to flow into the water intake pipe 31. During the drawing of the fluid 50 into the water intake pipe 31, the third check valve 36 is functioning for preventing the fluid 50 inside the water intake pipe 31 from backwashing. In addition, there can be a flexible object, such as a compressible air bag or a compressible hollow/solid ball, that is to be placed inside the reservoir 32 to be used for providing a predetermined pressure inside the reservoir 32 so as to prevent external air from flowing into the reservoir 32 through the first check valve 34.

Between the pressing and the releasing of the flexible housing 41 by the hand 62, the piston 42 is moved reciprocatively for drawing the fluid 50 to flow continuously into the water intake pipe 31 and the water-drawing tank 38. The water-drawing tank 38 is formed with a second water storage volume. In an embodiment, the second water storage volume of the water-drawing tank 38 is equal to the first water storage volume of the reservoir 32. Moreover, the resilience force of the elastic element 43 and the sectional area of the piston 42 are designed according to actual requirement, whereas the product of the resilience force of the elastic element 43 and the sectional area of the piston 42 equals to the water-drawing pressure generated from the water drawing part 40. When there is a predetermined amount of fluid 50 being drawing and accumulated inside the water intake pipe 31 and the water-drawing tank 38, the fluid 32 can be enabled to flow through the first check valve 34 into the reservoir 32, while the fluid 50 in the reservoir 32 is prevented from backwashing into the water intake pipe 31 by the function of the first check valve 34. In addition, there can be a labor-saving device being mounted to the water drawing part 40 for assisting the pressing of the user. For instance, the labor-saving device can be a disc-like mass composed of a disc with ring-like groove and a mass disposed inside the ring-like groove, by that between the pressing and releasing of the flexible housing 41, the mass can be driven to move around the ring-like groove, and thus a centrifugal force is generated for assisting the pressing and releasing of the elastic element 43. It is noted that such centrifugal force is increased with the increasing of the size of the disc and the rotation speed of the mass, and the large the centrifugal force there is, the less effort is required for the pressing of the flexible housing 41. Moreover, when there is a predetermined amount of fluid 50 being drawing and accumulated inside the reservoir 32, the fluid 32 inside the reservoir 32 can be enabled to flow through the second check valve 35 into the water discharge pipe 33, while the fluid 50 in the water discharge pipe 33 is prevented from backwashing to the reservoir 32 by the function of the second check valve 35. Moreover, as the second check valve 35 is designed to withstand an accumulation pressure, the relationship between the sectional area of the piston 42, the pressing of the elastic element 43 and the accumulation pressure of the second check valve 35 and the accumulation pressure of the second check valve is determined according to actual requirement. In an embodiment, the accumulation pressure of the second check valve 35 equals to the product of the sectional area of the piston 42 and the amount of time that the elastic element 43 is being pressed. At the same time when the fluid 50 in the water discharge pipe 33 is prevented from backwashing into the reservoir 32 by the second check valve 35, fluid 50 can be such by the suction from the mouth 61 of the user 60 to flow toward the exit filtration part 20 via the water discharge pipe 33, and thus the fluid will flow into the resin filter 22 via the membrane filter 23. It is noted that the resin filter 22 is formed with a third water storage volume. In an embodiment, the third water storage volume of the resin filter 22 is equal to the first water storage volume of the reservoir 32. By the function of the membrane filter 23 and the resin filter 22, the fluid 50 can be filtered and purified, especially when the fluid 50 is seawater, the salt and dirt containing in the seawater can be removed before it is guided to flow through another membrane filter 24 where it is being filtered again into a clean drinkable fresh water that can be provided to the user 60. Accordingly, the fluid 50 is drawn to flow sequentially through the membrane filter 22, the resin filter 22 and the membrane filter 24 so as to be filtered three times. However, in some case, there can be only the resin filter 22 in the seawater desalination unit without the two membrane filters 23, 24, or there can be one membrane filter 23 disposed in front of the resin filter 22, or there can the resin filter 22 and the membrane filter 24 disposed thereafter.

Since the first shell 21 is screwed to the frame 30 by the mating of the threads 25, 37, the exit filtration part 20 can be removed and replaced easily after being used for a period of time and the effectiveness thereof is no longer satisfactory, by that the lifespan of both the frame 30 and the water drawing part 40 can be prolonged.

Figure 5:
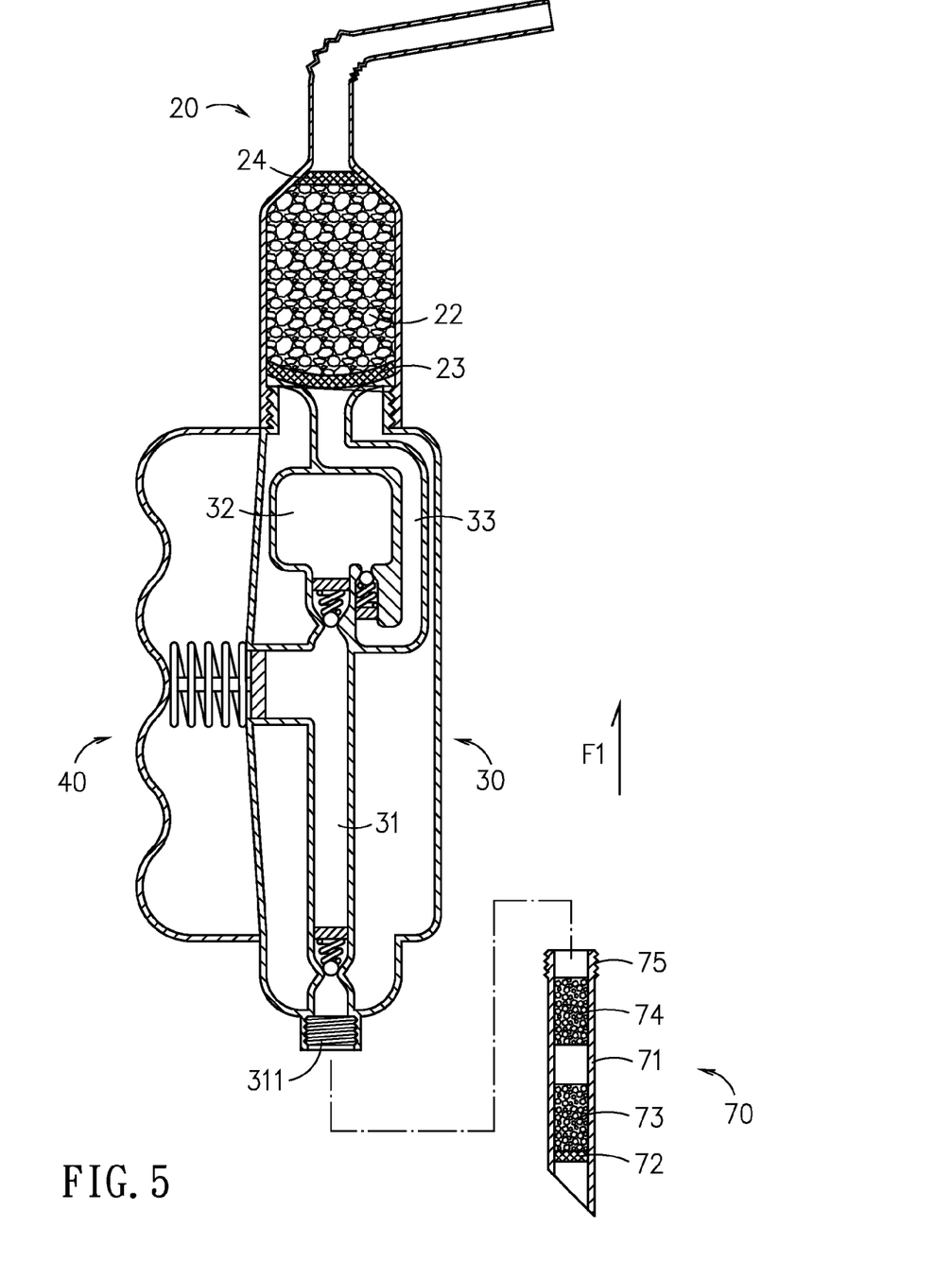
FIG. 5 to FIG. 7 are three cross-sectional diagrams respectively showing three recue units of different designs according to three different embodiments of the present disclosure.

Please refer to FIG. 5, which shows a recue device according to another embodiment of the present disclosure, and is basically the same as that disclosed in FIG. 2. As shown in FIG. 5, the water intake pipe 31 is configured with an entrance filtration part 70, and the entrance filtration part 70 is disposed at an end of the water intake pipe 31 that is opposite to the end thereof connecting to the reservoir 32. The entrance filtration part 70 is configured with a second shell 71, and the second shell 71 is formed like an elongated tube, that is extending in a direction parallel to the first direction F1 by a length. Moreover, there are a membrane filter 72 and a plurality of activated carbon filters 73, 74 being arranged inside the second shell 71, whereas the plural activated carbon filters 73, 74 are sandwiched between the membrane filter 72 and the frame 30. In this embodiment, the membrane filter 72 is made of a non-woven cloth, but the entrance filter disposed at the entrance filtration part 70 is not limited to be the membrane filter or activated carbon filter. Similarly, the second shell 71 and the frame 30 are respectively configured with mating screw threads 75, 311 for allowing the entrance filtration part 70 to mount detachably to the frame 30. In this embodiment, one end of the second shell 71 that is disposed opposite to the one end thereof being connected to the frame 30 is arranged submerging in the fluid, by that the fluid can be drawn to flow into the entrance filtration part 70 when the water drawing part 40 is being pressed. After being drawn to flow into the entrance filtration part 70, the fluid will be filtered by the membrane filter 72 and the activated carbon filters 73, 74, and then is being guided to flow sequentially through the water intake pipe 31, the reservoir 32, the water discharge pipe 33 to the exit filtration part 20 so as to be transformed into drinkable fresh water. Comparing to the embodiments shown in FIG. 1 to FIG. 4, the seawater desalination unit of the present embodiment has better filtering performance since it is configured with the additional entrance filtration part 70. Nevertheless, after being used for a long period of time, both the effectiveness of the exit filtration part 20 and the entrance filtration part 70 can be deteriorated, so that both the exit filtration part 20 and the entrance filtration part 70 are designed to be detached and removed easily for replacement, by that the lifespan of both the frame 30 and the water drawing part 40 can be prolonged.

Figure 6:
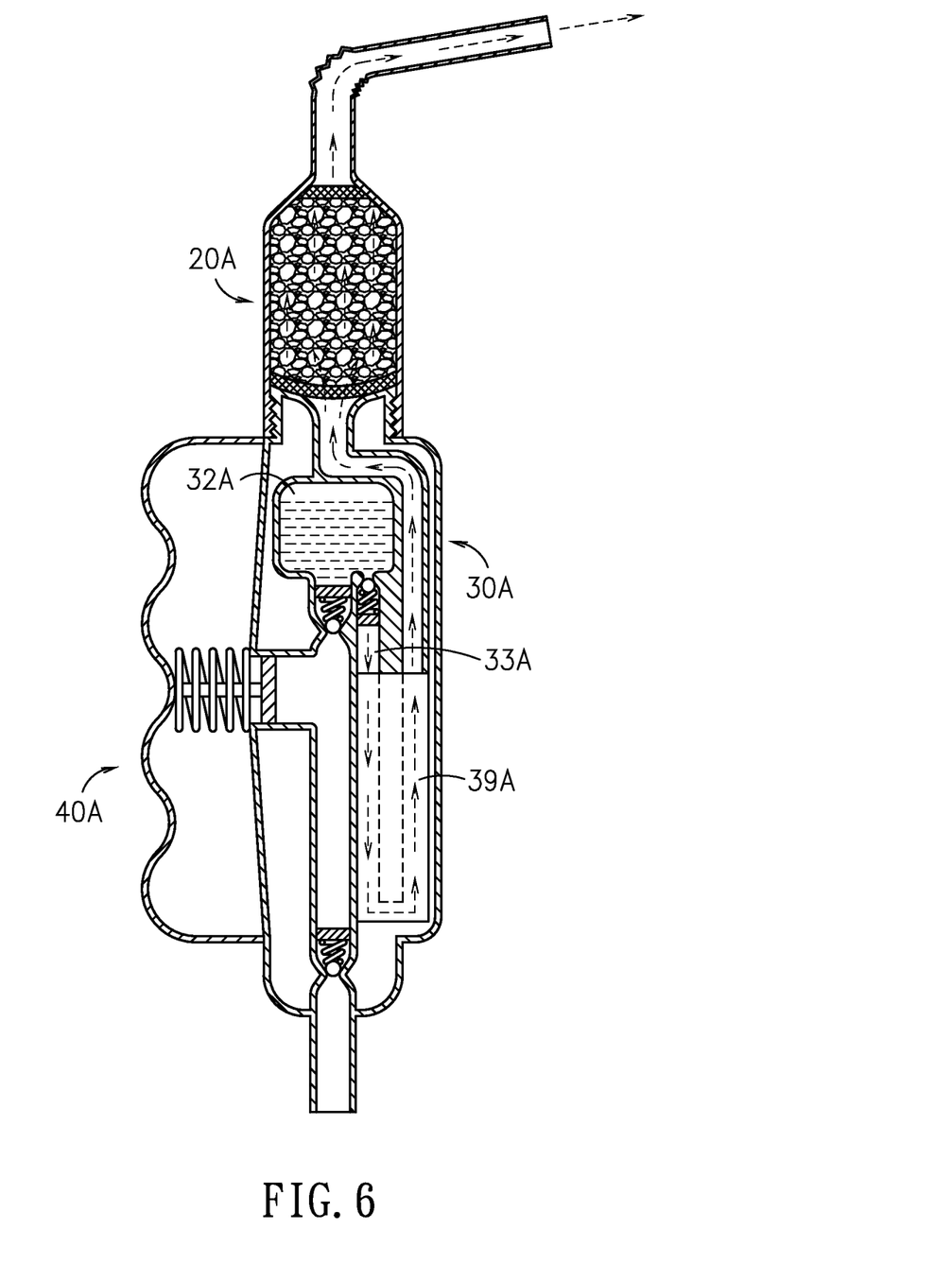

Please refer to FIG. 6, which shows a recue device according to another embodiment of the present disclosure. It is noted that the seawater desalination unit shown in FIG. 6 is composed of an exit filtration part 20A, a frame 30A and a water drawing part 40A, and is basically the same as that disclosed in FIG. 2. Nevertheless, the present embodiment is characterized in that: there is a reverse osmosis (RO) device 39A arranged at the water discharge pipe 33A. Thereby, the fluid that is drawn to flow from the reservoir 32A into the water discharge pipe 33A will be force to flow through the RO device 39A for filtration before it is being guided to flow toward the exit filtration part 20A.

Figure 7:
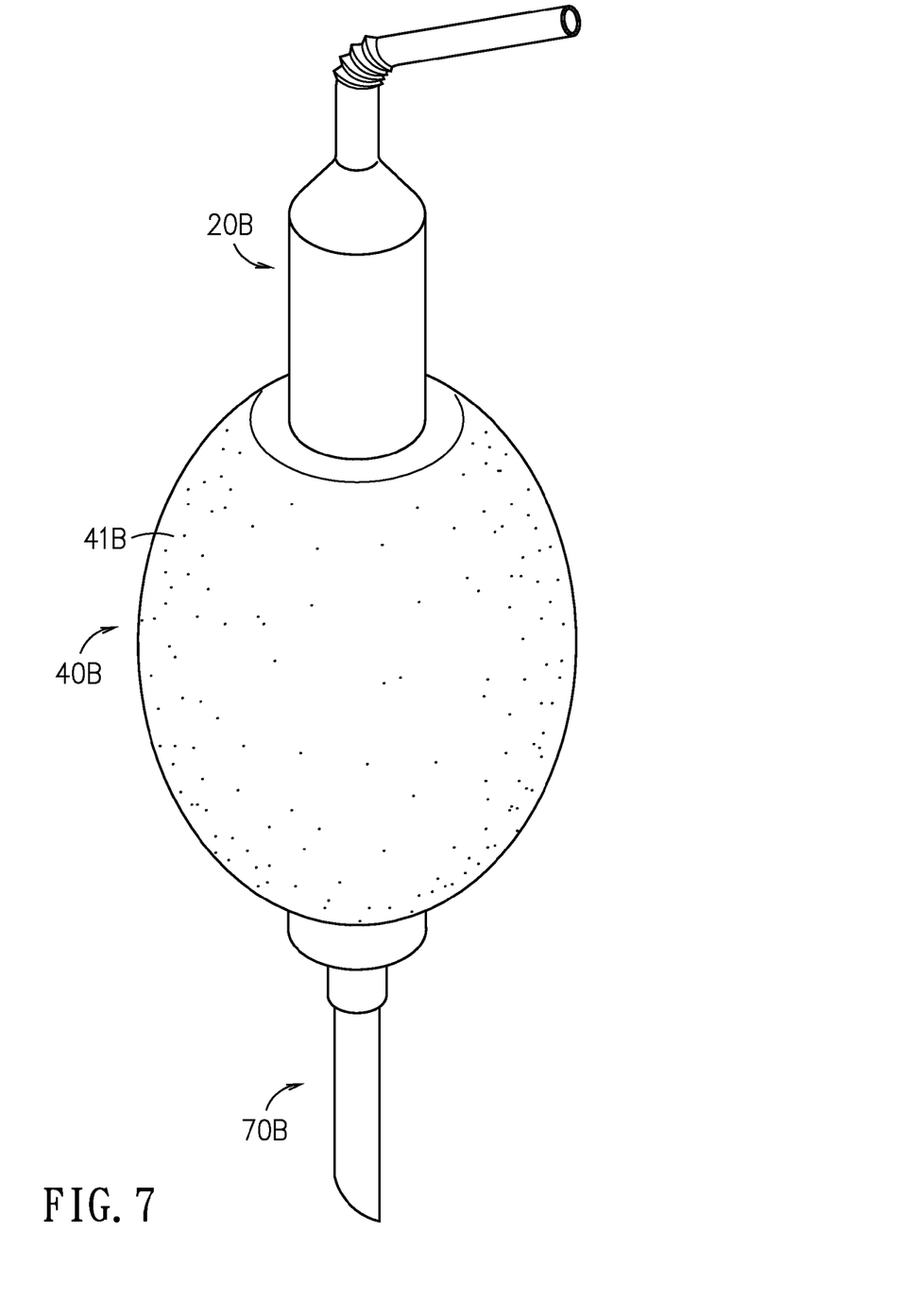

Please refer to FIG. 7, which shows a recue device according to another embodiment of the present disclosure. It is noted that the seawater desalination unit shown in FIG. 7 is composed of an entrance filtration part 70B, an exit filtration part 20B, a frame and a water drawing part 40B, and is basically the same as that disclosed in FIG. 2. Nevertheless, the present embodiment is characterized in that: the flexible housing 41B of the present embodiment is shaped like an oval ball, while the frame of the present embodiment is about the same in structure as the frame 30 shown in FIG. 2.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A seawater desalination unit, comprising:
   an exit filtration part, comprising an exit filter;
   a frame, comprising:
      a reservoir, having a first water storage volume;
      a water intake pipe, having a first end connected to the reservoir;
      a first check valve, disposed beneath said reservoir and between said reservoir and said first end;
      a water discharge pipe connected to the exit filtration part and the reservoir respectively via two opposite ends thereof; and
      a second check valve, disposed beneath said reservoir and between the reservoir and the water discharge pipe; and
   a water drawing part, in constant fluid communication with the water intake pipe for generating a water-drawing pressure to force a fluid to flow from a second end of the water intake pipe that is not connected to the reservoir into the reservoir, said water drawing part comprising:
   a flexible housing, disposed outside the frame;
   a piston, disposed inside the flexible housing and inside a water-drawing tank of the frame that is arranged in fluid communication with the water intake pipe; and
   an elastic element, arranged inside the flexible housing at a position between the flexible housing and the piston to be used for providing a resilience force to work upon the flexible housing and the piston in a manner that the piston is brought along to move reciprocatively inside the water-drawing tank between the pressing of the flexible housing from the an exterior thereof and the releasing of the elastic element.

2. The seawater desalination unit of claim 1, wherein the water intake pipe is extending parallel to a first direction by a length, and the piston is disposed for allowing the same to move reciprocatively in a moving direction parallel to a second direction, while the first direction and the second direction are orientated perpendicular to each other.

3. The seawater desalination unit of claim 2, wherein the first direction is orientated perpendicular to a level surface of the fluid.

4. The seawater desalination unit of claim 1, wherein the water-drawing tank is formed with a second water storage volume, and the second water storage volume is equal to the first water storage volume.

5. The seawater desalination unit of claim 1, wherein the product of the resilience force of the elastic element and a sectional area of the piston equals to the water-drawing pressure.

6. The seawater desalination unit of claim 1, wherein the second check valve is designed to withstand an accumulation pressure, and the accumulation pressure of the second check valve equals to the product of a sectional area of the piston and the amount of time that the elastic element is being pressed.

7. The seawater desalination unit of claim 1, wherein the flexible housing is corrugated in a wave shape, or the flexible housing is formed into an an oval ball shape.

8. The seawater desalination unit of claim 1, wherein the flexible housing is made of a water resistance material selected from the group consisting of:
a rubber and a plastic.

9. The seawater desalination unit of claim 1, wherein an output end of the exit filtration part, arranged opposite to an input end of the exit filtration part connecting to the frame, is formed with a tube structure.

10. The seawater desalination unit of claim 9, wherein the tube structure is configured with a flexible structure for allowing the tube structure to become bendable and retractable.

11. The seawater desalination unit of claim 1, wherein the exit filtration part is configured with a first shell, and the at least one exit filter of the exit filtration part is disposed inside the first shell.

12. The seawater desalination unit of claim 11, wherein the first shell and the frame are respectively configured with mating screw threads for allowing the exit filtration part to mount detachably to the frame.

13. The seawater desalination unit of claim 11, wherein the at least one exit filter includes a resin filter formed by the mixing of cation exchange resin particles and anion exchange resin particles.

14. The seawater desalination unit of claim 13, wherein the resin filter is disposed sandwiching between two membrane filters.

15. The seawater desalination unit of claim 1, wherein the at least one exit filter includes a seawater desalination reverse osmosis membrane.

16. The seawater desalination unit of claim 15, wherein seawater desalination reverse osmosis membrane is disposed sandwiching between two membrane filters.

17. The seawater desalination unit of claim 1, wherein the exit filtration part has a third water storage volume, and the third water storage volume is equal to the first water storage volume.

18. The seawater desalination unit of claim 1, wherein the water intake pipe is configured with an entrance filtration part, and the entrance filtration part has at least one entrance filter disposed thereat at a position for enabling the fluid to be drawn and flow through the at least one entrance filter of the entrance filtration part into the water intake pipe and thus enter the reservoir.

19. The seawater desalination unit of claim 18, wherein the entrance filtration part is configured with a second shell, and the at least one entrance filter of the entrance filtration part is disposed inside the second shell.

20. The seawater desalination unit of claim 19, wherein the exit filtration part is configured with a first shell, the at least one exit filter of the exit filtration part is disposed inside the first shell, the second shell is an elongated tube, and the first shell is extending in a direction parallel to a first direction by a length while enabling the first direction to be orientated perpendicular to a level surface of the fluid.

21. The seawater desalination unit of claim 19, wherein the second shell and the frame are respectively configured with mating screw threads for allowing the entrance filtration part to mount detachably to the frame.

22. The seawater desalination unit of claim 18, wherein each of the at least one entrance filter is composed of a membrane filter and at least one activated carbon filter, while allowing the at least one activated carbon filter to be disposed sandwiching between the membrane filter and the frame.

23. The rescue unit of claim 1, wherein the water intake pipe is further configured with a third check valve, and the third check valve is provided for preventing the fluid in the water intake pipe to backwash out of the water intake pipe.

24. The seawater desalination unit of claim 1, wherein the water discharge pipe is further configured with a reverse osmosis (RO) unit.

25. The seawater desalination unit of claim 1, wherein the frame is made of a water resistance material.

26. The seawater desalination unit of claim 1, wherein the reservoir is charged with air to a predefined pressure.

* * * * *